(12) United States Patent  (10) Patent No.: US 7,998,396 B2
Rousseau et al.  (45) Date of Patent: Aug. 16, 2011

(54) BLOW MOULDING OR STRETCH-BLOW MOULDING DEVICE AND METHOD FOR MANUFACTURING CONTAINERS USING CLAMPING MEANS SUITABLE FOR SUPPORTING A BLANK BY ITS NECK

(75) Inventors: Nicolas Rousseau, Octeville-sur-Mer (FR); Laurent Danel, Octeville-sur-Mer (FR)

(73) Assignee: Sidel Participations, Octeville-sur-Mer (FR)

( * ) Notice: Subject to any disclaimer, the term of this patent is extended or adjusted under 35 U.S.C. 154(b) by 0 days.

(21) Appl. No.: 12/594,923

(22) PCT Filed: Apr. 2, 2008

(86) PCT No.: PCT/FR2008/050580
§ 371 (c)(1),
(2), (4) Date: Oct. 6, 2009

(87) PCT Pub. No.: WO2008/139088
PCT Pub. Date: Nov. 20, 2008

(65) Prior Publication Data
US 2010/0109207 A1 May 6, 2010

(30) Foreign Application Priority Data

Apr. 6, 2007 (FR) ...................................... 07 02550

(51) Int. Cl.
*B29C 49/70* (2006.01)

(52) U.S. Cl. .......... 264/523; 425/522; 425/535; 425/529
(58) Field of Classification Search .................. None
See application file for complete search history.

(56) References Cited

U.S. PATENT DOCUMENTS

| 4,797,084 A | * | 1/1989 | Nakamura et al. | ............ 425/533 |
| 5,509,796 A | | 4/1996 | Di Settembrini | |
| 5,863,571 A | | 1/1999 | Santais et al. | |
| 6,824,731 B1 | * | 11/2004 | Zoppas | ......................... 264/523 |
| 2003/0077353 A1 | * | 4/2003 | Giacobbe | ....................... 425/534 |

FOREIGN PATENT DOCUMENTS

| FR | 2 720 679 A1 | 12/1995 |
| FR | 2 790 704 A1 | 9/2000 |

* cited by examiner

*Primary Examiner* — Monica A Huson
(74) *Attorney, Agent, or Firm* — Sughrue Mion, PLLC (57) ABSTRACT

The invention relates to a blowing or stretch-blowing device (1) for making vessels from thermoplastic blanks with a collar, that comprises a blowing nozzle (3) mobile between an upper position and a lower position for blowing a pressurised fluid into a blank having a body provided in the moulding cavity of a mould and having a collar protruding outside the mould, the device includes a clamping means (4) provided above the mould and capable of holding a blank by the collar thereof, a holding means (20, 21) for the clamping means for moving the same between two raised or lowered positions, wherein at least one branch (7, 8) of the clamping means being transversally mobile; mechanical coupling means (5) provided between the clamping means and the blowing nozzle and capable of synchronising the movements of the clamping means with the movement of the blowing nozzle.

17 Claims, 5 Drawing Sheets

BLOW MOULDING OR STRETCH-BLOW MOULDING DEVICE AND METHOD FOR MANUFACTURING CONTAINERS USING CLAMPING MEANS SUITABLE FOR SUPPORTING A BLANK BY ITS NECK

CROSS REFERENCE TO RELATED APPLICATIONS

This application is a National Stage of International Application No. PCT/FR2008/050580 filed Apr. 2, 2008, claiming priority based on French Patent Application No. 0702550, filed Apr. 6, 2007, the contents of all of which are incorporated herein by reference in their entirety.

FIELD OF THE INVENTION

The present invention relates to a blow moulding or stretch-blow moulding device for manufacturing containers from blanks made of thermoplastic material, in particular PET, provided with a neck, this device comprising a blowing nozzle for blowing a fluid under pressure inside a blank having a body arranged in a moulding cavity of a mould and having a neck protruding from a surface of the mould, with an annular flange of the neck resting on said surface of the mould, the blowing nozzle being mobile between two limit positions, namely a high position raised above the mould and a low blow moulding position in which the blowing nozzle is operatively in tight connection with the neck so that blow air under pressure is capable of being injected into the blank.

The present invention also relates to a blow moulding or stretch-blow moulding method for manufacturing containers from blanks made of thermoplastic material, in particular made of PET, provided with a neck, using a blow moulding or stretch-blow moulding device comprising a blowing nozzle for blowing a fluid under pressure inside a blank having a body arranged in a moulding cavity of a mould and having a neck protruding from a surface of said mould, an annular flange of said neck resting on said surface of the mould, the blowing nozzle being mobile between two limit positions, namely a high position raised above the mould and a low blow moulding position in which the blowing nozzle is operatively in tight connection with the neck so that blow air under pressure may be injected into the blank.

BACKGROUND OF THE INVENTION

A blow moulding device of the abovementioned type is in particular described in the document FR 2 790 704.

It is common practice for the blanks or preforms to be heated beforehand in a thermal conditioning oven before being transferred into a mould of a blow moulding device using a transfer wheel having a plurality of gripping arms on a periphery thereof.

In order to place the body of the blank or preform in the moulds, the control for opening the gripping arms of the transfer wheel is synchronized with the control for opening and closing the moulds, the body of the heated blank being inserted into the open mould and released once the mould is closed, the blank or preform then resting, by means of a radially-projecting annular flange provided in the neck part of the preform, against the upper surface of the mould.

However, in order to reduce the production costs of the blow moulded containers, it is common practice to reduce the mass of the preforms.

Thus, due to the fact that the heated blank rests on the upper surface of the mould only by means of flange thereof, the forces of gravity are not always sufficient to adequately hold the flange against the upper surface of the mould, which results in preforms not placed substantially coaxially with the main axis of the blowing nozzle. This results in non-compliant blow moulded containers with flanges which are not in a transversal plane to the axis of the blowing nozzle, i.e. resulting in inclined flanges. These containers then have to be discarded for destruction.

SUMMARY OF THE INVENTION

In order to reduce the losses caused by such malformed containers, it would be particularly useful to produce a blow moulding device making it possible to guarantee the placing of the preform or blank substantially coaxial with the blowing axis of the blowing nozzle.

According to a first aspect, the present invention relates to a blow moulding or stretch-blow moulding device for manufacturing containers from blanks made of thermoplastic material, in particular made of PET, provided with a neck, this device comprising a blowing nozzle for blowing a fluid under pressure inside a blank having a body arranged in a moulding cavity of a mould and having a neck protruding from a surface of said mould, with an annular flange of said neck resting on said surface of the mould, the blowing nozzle being mobile between two limit positions, namely a high position raised above the mould and a low blow moulding position in which the blowing nozzle is operatively in tight connection with the neck so that the blow air under pressure may be injected into the blank,

- wherein clamping means are arranged above the mould in the blow moulding or stretch-blow moulding device and are suitable for supporting a blank by the neck thereof substantially coaxially with the moulding cavity of the mould;
- wherein means of support of said clamping means are suitable for allowing a movement of said clamping means substantially parallel to the blowing axis of the blowing nozzle between a raised position and a lowered position in which the body of the blank is engaged in the cavity of the mould;
- wherein at least one limb of the clamping means is mobile transversely to the blowing axis of the blowing nozzle; and
- wherein mechanical coupling means are interposed between said clamping means and the blowing nozzle and are suitable for synchronizing the movements of the clamping means with the displacement of the blowing nozzle.

The blow moulding device thus obtained makes it possible to guarantee a better placing of the non-blow moulded blank in the blow moulding cavity substantially coaxially with the blowing axis.

According to an advantageous embodiment, at least one limb of the clamping means comprises a gripping arm as well as an arm holder capable of sliding on a transversal guide rail by means of a sliding carriage.

In order to facilitate maintenance work on the clamping means, in particular during modification of the dimensions of the blanks, the gripping arm is removably fixed to the arm holder.

In order to allow the mechanical and functional coupling of the blowing nozzle with the clamping means, at least one limb of the clamping means has at least one cam race suitable for engaging at least one cam roller fixed to the blowing nozzle.

According to an advantageous embodiment, the cam race of the limb is formed by an internal edge of the limb, opposite the other one of the two limbs.

In order to allow the two limbs to be moved closer to and further from each other, the clamping means has two limbs, through both of which a rod passes, having at least one end terminated by a fixed stop, of the washer type, and coiled spring means are provided on the rod supported on the one hand on the rod stop, and on the other hand on a support zone of the limb, the rod passing through a hole formed in the support zone, whereby variation in the contraction of the spring means determines the gap between the two limbs, thus allowing a blank to be gripped by its neck or released.

In order to allow the axial displacement of the clamping means, the transversal guide rail is fixed to support means, of the supporting-bar type, provided so as to slide on a guide rail coaxial with the blowing axis of the blowing nozzle by means of a sliding carriage.

In order to parameterize the displacement of the blowing nozzle, the blowing nozzle is attached to a means of control of the nozzle displacement comprising a roller suitable for engaging a fixed cam.

In order to limit the axial sliding of the clamping means and allow the opening and closing of the clamping means, stop means are provided against which the clamping means abut in order to limit the sliding of the clamping means on the guide rail coaxial with the blowing axis of the blowing nozzle. Advantageously, the means of support of the clamping means are capable of abutting against the stop means.

According to an advantageous embodiment of the coupling means, a transversal plate is fixed to the blowing nozzle, preferably on the blowing end of the nozzle, to which plate said at least one roller capable of following the cam race of the limb of the clamping means as well as the means of control of the displacement of the blowing nozzle is attached.

In a useful embodiment variant making it possible in particular to avoid fatigue of the spring means, magnetic means are provided on the faces opposite the limbs respectively, whereby the clamping means are magnetically locked in closed position.

According to a second aspect, the present invention relates to a blow moulding or stretch-blow moulding method for manufacturing containers from blanks made of thermoplastic material, in particular made of PET, provided with a neck, using a blow moulding or stretch-blow moulding device comprising a blowing nozzle for blowing a fluid under pressure inside a blank having a body arranged in a moulding cavity of a mould and having a neck protruding from a surface of said mould, an annular flange of said neck resting on said surface of the mould, the blowing nozzle being mobile between two limit positions, namely a high position raised above the mould and a low blow moulding position in which the blowing nozzle is operatively in tight connection with the neck so that blow air under pressure is capable of being injected into the blank, said method comprising at least the following steps:
- a step of gripping the neck of a non-blow moulded blank by clamping means provided above the mould in the blow moulding or stretch-blow moulding device;
- a step of lowering the nozzle from its high position;
- a step of placing the body of the blank in the moulding cavity by said clamping means;
- said gripping and placing steps being synchronized with the movement of the blowing nozzle;
- a step of blow moulding the blank using the nozzle once it has reached its low position;
- a step of lifting the nozzle back to its high position;
- a step of displacing the blow moulded blank out of the moulding cavity by said clamping means, said displacement step being synchronized with the movement of the blowing nozzle; and
- a step of transferring the blow moulded blank from the clamping means to external means for gripping blow moulded blanks.

In order to make it possible in particular for the non-blow moulded blanks to be gripped, the method according to the invention comprises at least one step of controlling the opening or closing of the clamping means.

According to an advantageous embodiment, the method according to the invention comprises a step of closing the clamping means in order to grip the non-blow moulded heated blank and a step of opening the clamping means after the blow moulding of the blank in order to transfer it to external means for gripping blow moulded blanks.

In order to allow synchronization of control between the clamping means and the blowing nozzle, the method according to the invention comprises a step of lifting the nozzle to its high position raised above the mould in order to allow the opening of the clamping means for the transfer of the blow moulded blank, and a step of partial descent of the blowing nozzle from its high position raised above the mould in order to allow the closing of the clamping means in order to grip a non-blow moulded heated blank, the clamping means remaining in abutment against stop means provided in the blow moulding or stretch-blow moulding device.

Advantageously, in order to allow the blow moulding of the blank by a bell-type nozzle, the method according to the invention comprises a step of opening the clamping means once the body of the non-blow moulded heated blank is placed in the moulding cavity and a step of closing the clamping means once the blank is blow moulded, the body of the blow moulded blank remaining in the moulding cavity.

In order to allow the axial sliding of the clamping means, the method according to the invention comprises a step of partial descent of the blowing nozzle in the direction of its low blow moulding position before said step of placing the blank in the moulding cavity.

According to an embodiment of the invention, the method according to the invention further comprises a step of complete descent of the blowing nozzle to its low blow moulding position before the step of blow moulding the blank in order to allow the opening of the clamping means and the placing of the blank by its flange on the mould and a step of partial return of the blowing nozzle from the low blow moulding position in the direction of the high retracted position before said step of gripping the blow moulded blank using the clamping means in order to allow the closing of the clamping means for gripping the blow moulded blank, the clamping means remaining in abutment against the stop means provided in the blow moulding device.

BRIEF DESCRIPTION OF THE DRAWINGS

The present invention will now be described using an example which is purely illustrative and in no way limitative of the scope of the present invention, and starting with the attached illustrations in which.

DETAILED DESCRIPTION OF THE INVENTION

Figure 1:
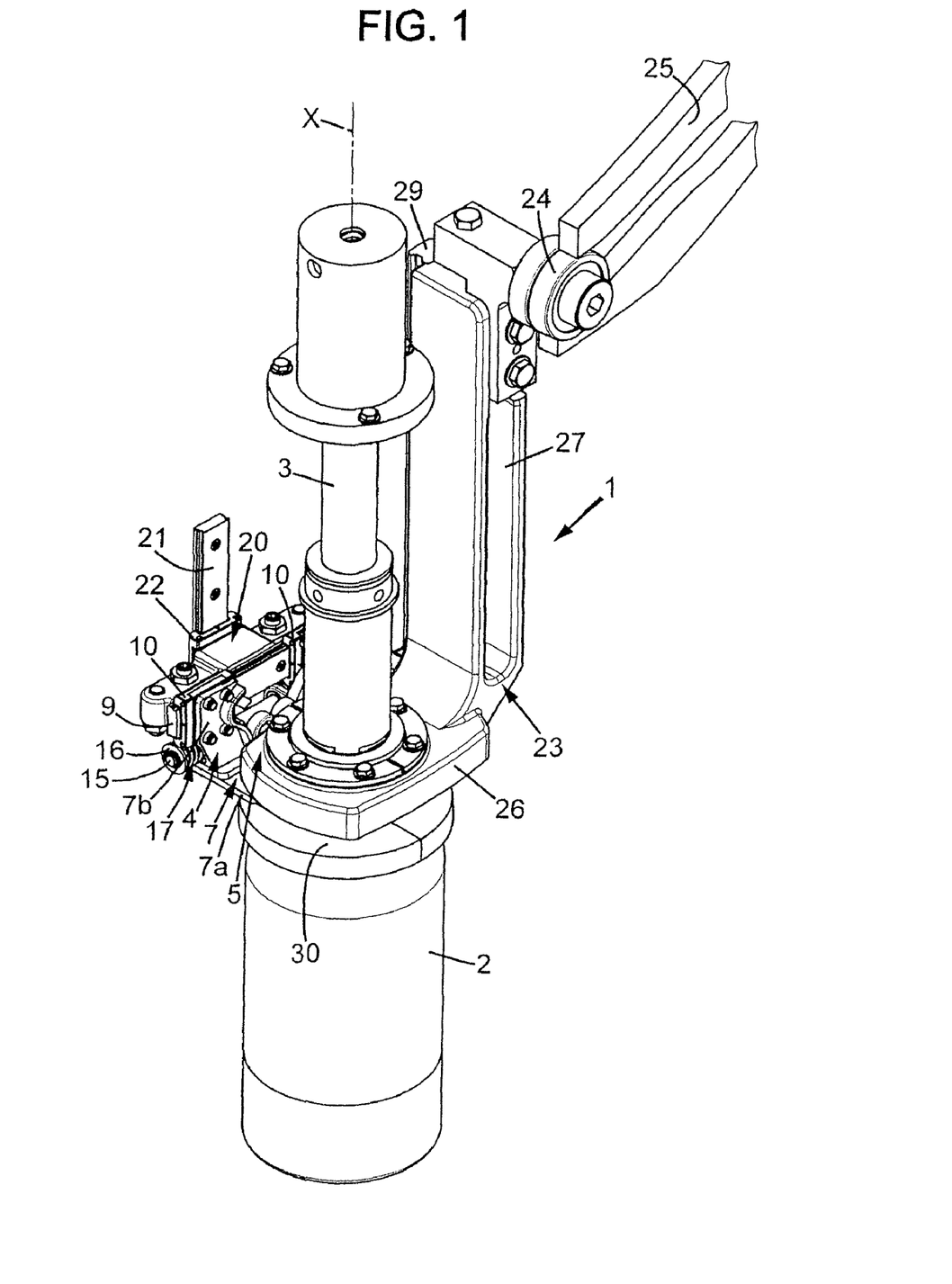
FIG. 1 is a perspective view of the blow moulding device according to the invention, the blowing nozzle being in its low blow moulding position.

FIG. 1 shows a diagrammatical and partial perspective view of a blow moulding or stretch-blow moulding device 1 for manufacturing containers 2 from blanks made of thermoplastic material, in particular made of PET (for example a preform), provided with a neck, this device 1 comprising a blowing nozzle 3 for blowing a fluid under pressure inside a blank having a body arranged in a moulding cavity of a mould and with its neck protruding from the mould.

The blowing nozzle 3 is mobile between two limit positions, namely a high position raised above the mould and a low blow moulding position in which the blowing nozzle 3 is operatively in tight connection with the neck so that blow air under pressure may be injected into the blank.

The blow moulding device 1 comprises clamping means 4 suitable for supporting a blank by its neck, as well as mechanical coupling means 5 interposed between said clamping means 4 and the blowing nozzle 3 and suitable for synchronizing the movements of the clamping means 4 with the displacement of the blowing nozzle 3, as well as controlling the opening and closing of the clamping means 4 with the control of the blow moulding and displacement of the blowing nozzle 3.

The clamping means 4 comprise two limbs 7, 8 at least one of which is mobile transversely to the blowing axis (X) of the blowing nozzle 3.

Figure 2:
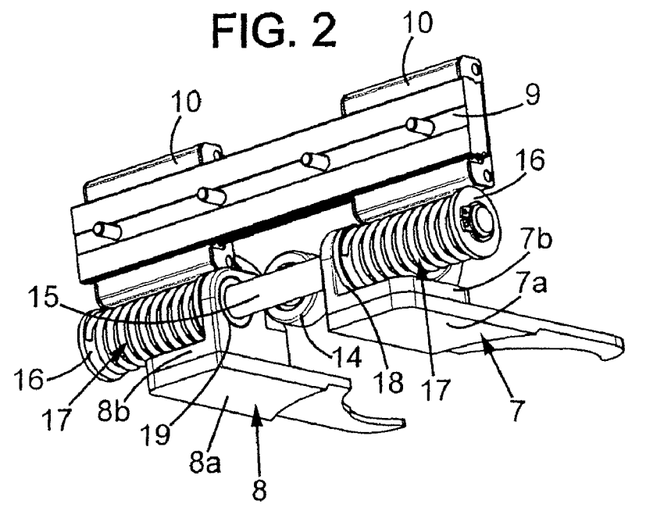
FIG. 2 is a rear perspective view of the means for clamping the blank according to the invention, the clamping means being in their position allowing the blow moulding of the blank.

As shown more precisely in FIG. 2 with a rear perspective view of the clamping means 4, at least one of the limbs 7, 8 of the clamping means 4 comprises a gripping arm 7a, 8a as well as an arm holder 7b, 8b adapted for sliding on a guide rail 9 transversal to the blowing axis (X) by means of a sliding carriage 10.

In the case where the two limbs 7, 8 are arranged transversely mobile, then each arm holder 7b, 8b is fixed to a carriage 10 sliding transversely on the guide rail 9. Alternatively, it is also possible to provide two guide rails instead of the guide rail 9, a guide rail 9 then being respectively associated with a sliding carriage 10 of one of the two limbs 7, 8 of the clamping means 4.

The gripping arm 7a, 8a is preferably removably fixed to the respective arm holder 7b, 8b using any fixing means known per se, for example screwing means.

Figure 3:
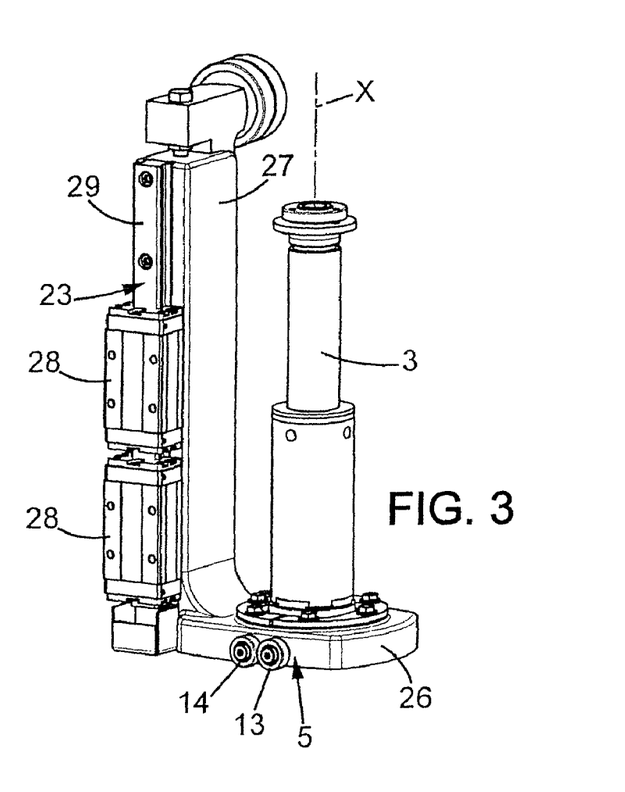
FIG. 3 is a rear perspective view of the means of control of the displacement of the blowing nozzle according to the invention.

At least one limb 7, 8 of the clamping means 4 has at least one cam race 11, 12 suitable for cooperating with the mechanical coupling means 5 in the form of at least one cam roller 13, 14 fixed to the blowing nozzle 3 and as shown in FIG. 3 in a rear partial perspective view of the blowing nozzle 3.

It is well understood that, according to the preferred embodiment of the invention, provision is made to make the two limbs transversely mobile and both controlled in transversal translation movement by means respectively of two cam rollers 13, 14, but that it is also possible to provide only a single one of the two limbs 7, 8 transversely mobile and controlled in transversal translation movement by means of only one cam roller 13, 14 capable of cooperating with a cam race 11, 12 formed in the limb 7, 8, and preferably formed in the arm holder 7b, 8b of the limb 7, 8.

According to a preferred embodiment of the invention, the cam race 11, 12 of said limb 7, 8 is formed by an internal flange of said limb 7, 8 opposite the other one of the two limbs 7, 8.

Thus, preferably, the limbs 7, 8 have two opposite edges against which the rollers 13, 14 provided fixed to the blowing nozzle 3 are able to cooperate and run.

It is within the competence of a person skilled in the art to adapt the shape, in particular the curves, of each cam race 11, 12 in order to control the transversal displacement of each limb 7, 8 on the guide rail 9.

Alternatively, instead of the cam rollers 13, 14 fixed to the blowing nozzle 3 suitable for cooperating with cam races 11, 12 provided respectively in each limb 7, 8 of the clamping means 4, it is also possible to provide at least one cam roller, and preferably two cam rollers, fixed respectively to each limb 7, 8 of the clamping means 4 and suitable for cooperating with at least one cam race provided formed in the blowing nozzle 3, for example at the level of the blowing end of the blowing nozzle 3. In order to do this, a plate can be fixed to the blowing nozzle 3, the side edges of which plate form the cam races of the two rollers fixed to the two limbs 7, 8.

As shown more precisely in FIG. 2, in order to control the gap between the two limbs 7, 8, the clamping means 4 have two limbs 7, 8 through both of which passes a rod 15, of which at least one end and preferably both ends is terminated by a fixed stop 16, of the washer type.

Coiled spring means 17 are provided on the rod 15 bearing on the one hand on the stop 16 of the rod 15, and on the other hand on a support zone 18 of the limb 7, 8, the rod 15 passing through a hole 19 formed in the support zone 18, due to which the variation in the contraction of the spring means 17 determines the gap between the two limbs 7, 8, thus allowing a blank to be gripped by its neck or not. A preferred operating mode of the clamping means 4 will be seen subsequently.

The transversal guide rail 9 is fixed to support means 20, of the supporting-bar type, provided sliding on a guide rail 21 coaxial with the blowing axis X of the blowing nozzle 3 by means of a sliding carriage 22, the guide rail 21 being in general provided fixed to a console in which there is provided the assembly of the component parts (mould, blowing nozzle 3 and clamping means 4) of the blow moulding device 1.

The blowing nozzle 3 is attached to a means 23 of control of the displacement of the nozzle 3 comprising a roller 24 suitable for cooperating with a fixed cam 25 (see FIG. 1).

More precisely, a transversal plate 26 is fixed to the blowing nozzle 3, preferably at the end of the blowing nozzle 3, a plate 26 to which there are fixed and attached the rollers 13, 14 adapted for following the cam races 11, 12 of the limbs 7, 8 of the clamping means 4 as well as the means 23 of control of the displacement of the blowing nozzle 3.

As shown in FIG. 3 according to a rear partial perspective view, the control means 23 is presented in the form of a column 27 supported on the transversal plate 26 and adapted for sliding axially in guide carriages 28 by means of a rail 29 fixed to the column 27.

The blow moulding device comprises stop means (not shown in the figures) against which the clamping means 4 abut in order to limit the sliding of the clamping means 4 on the guide rail coaxial with the blow moulding axis (X) of the blowing nozzle 3, and more precisely the support means 20 of the clamping means 4 are adapted for abutting against the stop means.

More precisely, the stop means are of a type known per se and provided above and below the support means 20 of the clamping means 4 in order to define an upper limit and a lower limit during the sliding of the carriage 22 on the axial guide rail 21, itself provided on a fixed console of the blow moulding device.

FIGS. 4 to 7 respectively show four steps during the displacement and opening/closing of the clamping means 4, namely the steps of gripping a non-blow moulded blank until it is blow moulded, the steps being identical, but in reverse order, for gripping the blow moulded blank and its transfer to external gripping means.

In fact, according to a second of its features, the present invention relates to a blow moulding or stretch-blow moulding method for manufacturing containers from blanks made of thermoplastic material, in particular made of PET, provided with a neck using a blow moulding or stretch-blow moulding device 1 comprising a blowing nozzle 3 for blowing a fluid under pressure inside a blank having a body arranged in a moulding cavity of a mould and with its neck protruding from the mould, the blowing nozzle 3 being mobile between two limit positions, namely a high position raised above the mould and a low blow moulding position in which the blowing nozzle 3 is operatively in tight connection with the neck so that blow air under pressure may be injected into the blank.

Figure 4:
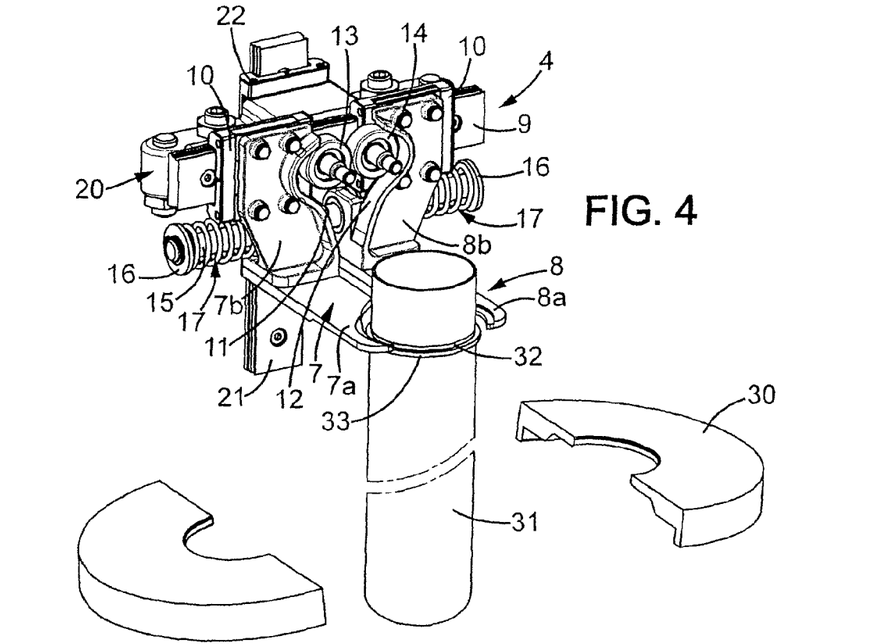
FIG. 4 is a front perspective view of the means for clamping the blank, the blowing nozzle being in its high raised position with the clamping means open in the position for transferring/receiving a blank.
Figure 5:
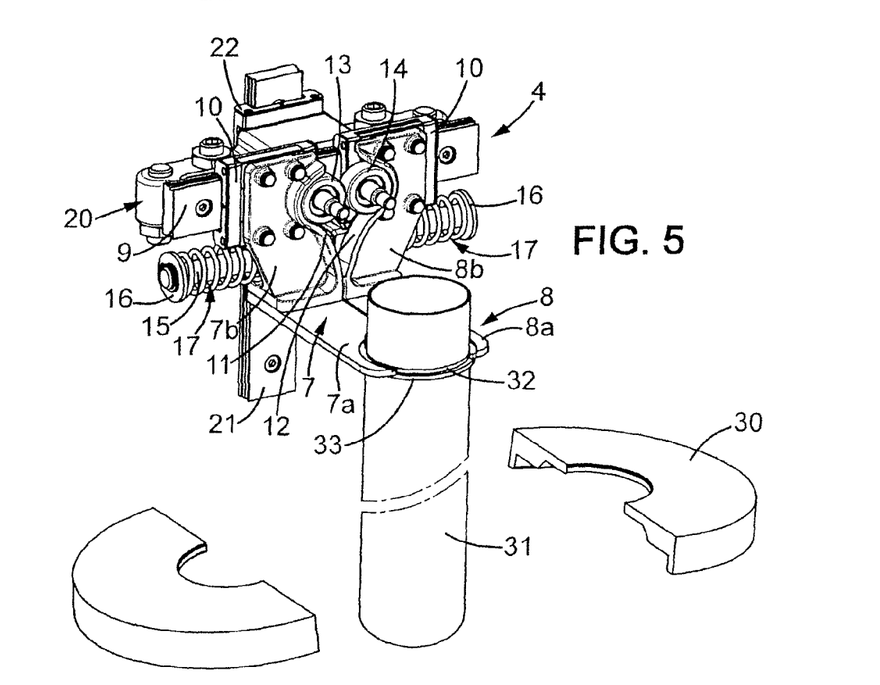
FIG. 5 is a front perspective view of the means for clamping the blank, the blowing nozzle being partially descended from its high position in the direction of the low position leading to the closure of the clamping means, preferably at the level of the tamper-resistance groove of the blank, and holding of the non-blow moulded blank.
Figure 6:
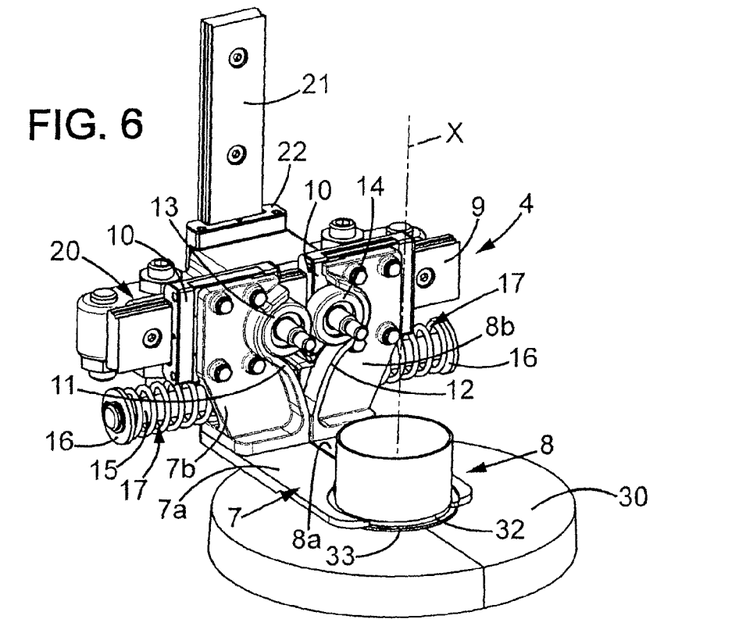
FIG. 6 is a front perspective view of the means for clamping the blank, the blowing nozzle having descended in the direction of its blow moulding position, and still in their position of holding the blank.
Figure 7:
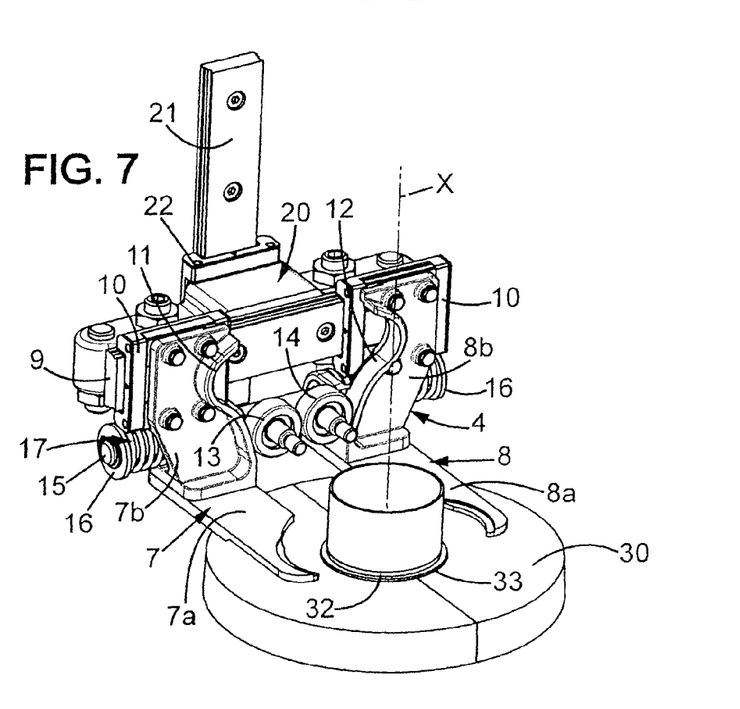
FIG. 7 is a front perspective view of the clamping means in their position allowing blow moulding of the blank.

In a general manner, the method comprises at least the following steps:
- a step of gripping the neck of a non-blow moulded blank by the clamping means 4 provided in the blow moulding or stretch-blow moulding device, this step being illustrated in FIGS. 4 and 5; preferably, the clamping means 4 grip the non-blow moulded blank 31 by its neck with each of the arms 7a, 8a having an end arranged for accommodation in the tamper-resistance groove 32 of the blank 31, the tamper-resistance groove 32 being situated just above the flange 33 of the blank 31;
- a step of placing the body of the blank in the moulding cavity by said clamping means 4, this step being illustrated in FIGS. 6 and 7, the flange 33 of the blank 31 then being supported against the upper surface 30 of the mould;
- a step of blow moulding the blank;
- a step of displacement of the blow moulded blank by the clamping means 4 outside the moulding cavity;
- a step of transfer of the blow moulded blank from the clamping means 4 to external means for gripping blow moulded blanks.

The step of gripping the non-blow moulded blank and the step of transfer of the blow moulded blank are preferably carried out by means of a step which controls the opening or closing of the clamping means 4.

More precisely, the method according to the invention comprises a step of closing the clamping means 4 in order to grip the non-blow moulded heated blank (delivered by external gripping means of non-blow moulded blanks) and a step of opening the clamping means 4 after the blow moulding of the blank in order to transfer it to external means for gripping blow moulded blanks.

Similarly, the method according to the invention optionally comprises a step of opening the clamping means 4 once the body of the non-blow moulded heated blank is placed in the moulding cavity and a step of closing the clamping means 4 once the blank is blow moulded, the body of the blow moulded blank remaining in the moulding cavity.

In more detailed manner, the method according to the invention comprises a step of lifting the nozzle back up to its high position raised above the mould in order to allow the opening of the clamping means 4 for the transfer of the blow moulded blank and a step of partial descent of the blowing nozzle from its high position raised above the mould in order to allow the closing of the clamping means 4 in order to grip a non-blow moulded heated blank, the clamping means 4 remaining in abutment against the high position stop means provided in the blow moulding or stretch-blow moulding device.

A step of partial descent of the blowing nozzle 3 is then provided in the direction of its low blow moulding position before the step of placing the non-blow moulded blank in the moulding cavity.

Finally, a step of total descent of the blowing nozzle 3 to its low blow moulding position is then provided before the step of blow moulding the blank in order to allow the opening of the clamping means 4 and the placing of the blank by its flange on the mould and a step of partial lifting the blowing nozzle from the low blow moulding position back in the direction of the retracted high position before the step of gripping the blow moulded blank by the clamping means 4 in order to allow the closing of the clamping means 4 for gripping the blow moulded blank, the clamping means 4 remaining in abutment against stop means provided in the blow moulding device 1 in the low position.

In other words, the method according to the invention comprises firstly the gripping of a non-blow moulded blank by the clamping means 4. In order to do this, the two limbs 7, 8 of the clamping means 4 are separated from each other by a distance so that it is possible to insert into the space between the two limbs 7, 8 the neck of a non-blow moulded blank. This position for gripping the non-blow moulded blank 31 is shown in FIG. 4. In fact, the cam races 11, 12 are formed such that, when the blowing nozzle 3 is in the high position, the two rollers 13, 14 firmly attached to the nozzle 3 move the two limbs 7, 8 slightly apart by bringing about a slight contraction of the spring means 17 leading to a reduction in the distance between the stop 16 of the rod 15 and the support zone 18 of the limbs 7, 8. In this position, the clamping means 4 are in abutment against stop means of any type making it possible to prevent the axial sliding of the clamping means 4 on the axial guide rail 21.

In order to grip the non-blow moulded blank, a partial descent of the blowing nozzle 3 then takes place from its high position (as shown in FIG. 4) to its low position, the cam races 11, 12 being formed so that this partial descent leads to the two limbs 7, 8 moving closer to each other and a gripping by clamping the neck of the blank 31 at the level of its tamper-resistance groove 32. The two rollers 13, 14 attached to the blowing nozzle 3 are then located in the position as shown in FIG. 5. The clamping means 4 are then no longer located in abutment against the stop means provided in the high position and have therefore slid slightly axially on the axial guide rail 21.

The blowing nozzle 3 has then descended axially towards its low position and as shown in FIG. 6. It should be noted that the cam races 11, 12 provided in the two limbs 7, 8 of the clamping means 4 are formed such that the descent of the clamping means 4 until they reach the stop means in the low position does not lead to the two limbs 7, 8 moving apart, the spring means 17 having a tensile stress such that the descending movement of the blowing nozzle 3 leads to the descending axial sliding of the clamping means 4 without causing a displacement of the rollers 13, 14 on the cam races 11, 12.

In their low position, the clamping means 4 are in abutment against stop means and the limbs 7, 8 are just above the upper surface 30 of the mould. However, the blowing nozzle 3 has not yet reached its low blow moulding position, even if the clamping means 4 have reached their low position.

In order to allow the opening of the clamping means 4 and for the flange 33 of the blank to be placed gently against the upper surface 30 of the mould, a descent of the blowing nozzle 3 then occurs, which leads to a displacement of the rollers 13, 14 on the cam races 11, 12 and a contraction of the spring means 17 causing the opening and the moving apart of the two limbs 7, 8 (see FIG. 7), the clamping means 4, being in abutment, are no longer able to slide on the axial guide rail 21.

Once the blank is blow moulded, the blowing nozzle 3 is then raised again, which causes both a moving together of the limbs 7, 8 of the clamping means 4, and the gripping of the blow moulded blank at the level of the tamper-resistance groove 32 of the blow moulded blank, the rollers 13, 14 being located in their so-called intermediate position with the spring means 17 in their non-contracted position (see FIG. 6).

The blowing nozzle 3 is then raised again until the clamping means 4 abut against upper stop means, the rollers 13, 14 remaining in position in the cam races 11, 12 of the two limbs 7, 8. The clamping means 4 are therefore again located in their position as shown in FIG. 5.

Once the clamping means 4 are in abutment against the upper stop means, a partial lifting of the blowing nozzle 3 occurs until it is in its high position which leads to a displacement of the rollers 13, 14 until they are in their high position which leads to the opening of the clamping means 4 allowing the gripping of the blow moulded blank by external gripping means, for example a transfer wheel. The clamping means 4 are then located in their position as shown in FIG. 4 allowing the transfer of the blow moulded blank in order to then grip a non-blow moulded blank 31 (generally a preform) which is received.

It is within the competence of a person skilled in the art to adapt the expansion force and the necessary contraction of the spring means 17, such that the rollers 13, 14 remain in their intermediate position without contraction during the sliding of the clamping means 4 on the guide rail 21 from the upper stop means to the lower stop means, and vice versa.

Figure 8:
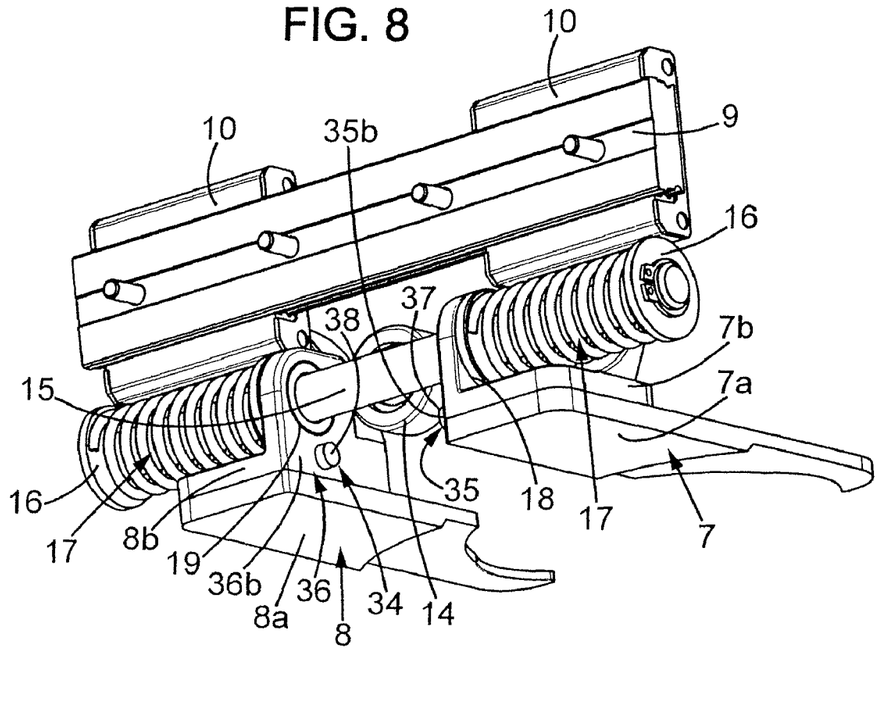
FIG. 8 is a perspective view similar to that of FIG. 2 showing a useful embodiment variant of the clamping means.

In particular, as illustrated in FIG. 8 in a representation similar to that of FIG. 2, it is possible to provide magnetic means 34 on the respective surfaces 35, 36 opposite the limbs 7, 8 of the clamping means 4. In order to avoid the difficulties inherent in the nature of the materials constituting the clamping means 4 and in the looping of the magnetic field lines, it is preferable to provide two magnets 37, 38 arranged opposite each other on the surfaces 35, 36 of the limbs 7, 8, preferably on the opposite surfaces 35b, 36b belonging respectively to the arm holders 7b, 8b. The magnets 37, 38 can be placed on said surfaces 35b, 36b as shown in FIG. 8 (only the magnet 37 being visible), the arms 7a, 8a then having to be formed in order to be side by side in the closed position of the clamping means 4. It is also possible to envisage an embedding of the magnets 37, 38 in said surfaces 35b, 36b so that the magnets 37, 38 are flush with the surfaces 35b, 36b.

Due to the presence of the magnets 37, 38, the two arm holders 7b, 8b are magnetically locked in closed position. It is thus ensured that the arms 7a, 8a correctly and firmly enclose the neck of a container, whatever the state of the return spring means 17, even if fatigued. During the opening of the clamping means 4, the purely mechanical control of opening by the rollers 13, 14 brought about by the cams 11, 12 respectively is not affected by the additional resistive force due to the magnets being side by side.

What is claimed is:

1. Blow moulding or stretch-blow moulding method for manufacturing containers from blanks with a neck made of thermoplastic material comprising PET, by a blow moulding or stretch-blow moulding device comprising a blowing nozzle for blowing a fluid under pressure inside a blank having a body arranged in a moulding cavity of a mould and having a neck protruding from a surface of said mould, a flange of said neck resting on said surface of the mould, the blowing nozzle being mobile between two limit positions, comprising a high position raised above the mould and a low blow moulding position in which the blowing nozzle is operatively in tight connection with the neck so that blow air under pressure is injected into the blank, the method comprising at least the following steps:
a step of gripping the neck of a non-blow moulded heated blank by clamping means provided above the mould;
a step of lowering the blowing nozzle from the high position;
a step of placing the body of the non-blow moulded heated blank in the moulding cavity by said clamping means;
a step of opening the clamping means once the body of the non-blow moulded heated blank is placed in the moulding cavity;
said gripping and placing steps being synchronized with the movement of the blowing nozzle;
a step of blow moulding the blank using the blowing nozzle once the blowing nozzle has reached the low blow moulding position;
a step of lifting the blowing nozzle back to the high position;
a step of closing the clamping means once the blank is blow moulded, the body of the blow moulded blank remaining in the moulding cavity;
a step of displacing the blow moulded blank out of the moulding cavity by said clamping means, said displacing step being synchronized with the movement of the blowing nozzle; and
a step of transferring of the blow moulded blank from the clamping means to external means for gripping blow moulded blanks.

2. Blow moulding or stretch-blow moulding method according to claim 1, comprising at least one step of controlling the opening or the closing of the clamping means.

3. Blow moulding or stretch-blow moulding method according to claim 2, comprising:
a step of closing the clamping means to grip the non-blow moulded heated blank; and
a step of opening the clamping means after the blow moulding of the blank to transfer the blank to the external means for gripping blow moulded blanks.

4. Blow moulding or stretch-blow moulding method according to claim 2, comprising:
a step of lifting the blowing nozzle back up to the high position raised above the mould in order to allow the opening of the clamping means for the transfer of the blow moulded blank; and
a step of partial descent of the blowing nozzle from the high position raised above the mould to allow the closing of the clamping means to grip the non-blow moulded heated blank, the clamping means remaining in abutment against stop means provided in the blow moulding or stretch-blow moulding device.

5. Blow moulding or stretch-blow moulding method according to claim 1, comprising a step of partial descent of the blowing nozzle in the direction of the low blow moulding position before said step of placing the blank in the moulding cavity.

6. Blow moulding or stretch-blow moulding method according to claim 1, further comprising:

a step of total descent of the blowing nozzle to the low blow moulding position before said step of blow moulding of the blank to allow the opening of the clamping means and the placing of the blank by a respective flange on the mould; and a step of partial lifting of the blowing nozzle from the low blow moulding position in the direction of the high position before said step of gripping of the blow moulded blank by the clamping means to allow the closing of the clamping means for the gripping of the blow moulded blank, the clamping means remaining in abutment against stop means provided in the blow moulding or stretch-blow moulding device.

7. Blow moulding or stretch-blow moulding device for manufacturing containers with a neck, from blanks made of thermoplastic material comprising PET, the device comprising:

a blowing nozzle for blowing a fluid under pressure inside a blank having a body arranged in a moulding cavity of a mould and having a neck protruding from a surface of said mould, with a flange of said neck resting on said surface of the mould, the blowing nozzle being mobile between two limit positions comprising a high position raised above the mould and a low blow moulding position in which the blowing nozzle is operatively in tight connection with the neck so that blow air under pressure is injected into the blank;

clamping means, arranged above the mould, for supporting a blank by a respective neck substantially coaxially with the moulding cavity of the mould;

wherein means for supporting said clamping means allows a movement of said clamping means substantially parallel to the blowing axis of the blowing nozzle between a raised position and a lowered position in which the body of the blank is engaged in the cavity of the mould;

at least one limb of the clamping means is mobile transversely to the blowing axis of the blowing nozzle; and mechanical coupling means is interposed between said clamping means and the blowing nozzle, for synchronizing the movements of the clamping means with the displacement of the blowing nozzle, and the at least one limb of the clamping means has at least one cam race adapted for engaging at least one cam roller fixed to the blowing nozzle.

8. Blow moulding or stretch-blow moulding device according to claim 7, wherein the at least one limb of the clamping means comprises a gripping arm and an arm holder adapted for sliding on a transversal guide rail by means of a sliding carriage.

9. Blow moulding or stretch-blow moulding device according to claim 8, wherein the gripping arm is removably fixed to the arm holder.

10. Blow moulding or stretch-blow moulding device according to claim 7, wherein the cam race of said limb is formed by an internal edge of said limb.

11. Blow moulding or stretch-blow moulding device according to claim 7, wherein the clamping means comprises:
two limbs each having a support zone;
a rod which passes through a hole formed in the support zones of the limbs,
a fixed stop which terminates at least one end of the rod, the fixed stop being a washer, and
coiled spring means which is provided on the rod and supported by the fixed stops, and the support zones,
whereby the variation in the contraction of the spring means determines the gap between the limbs, thus allowing or not allowing the gripping of a blank by the respective neck.

12. Blow moulding or stretch-blow moulding device according to claim 8, wherein a transversal guide rail is fixed to support means and is provided sliding on a guide rail coaxial with the blowing axis of the blowing nozzle by means of a sliding carriage.

13. Blow moulding or stretch-blow moulding device according to claim 12, wherein stop means is provided against which, in the high position and in the low blow moulding position, the clamping means abut in order to limit the sliding of the clamping means on the guide rail coaxial with the blowing axis of the blowing nozzle.

14. Blow moulding or stretch-blow moulding device according to claim 13, wherein said means for supporting said clamping means is adapted for abutting against said stop means.

15. Blow moulding or stretch-blow moulding device according to claim 11, wherein magnetic means is provided on opposite surfaces of the limbs, respectively, whereby the clamping means is magnetically locked in the closed position.

16. Blow moulding device for manufacturing containers with a neck, from blanks made of thermoplastic material comprising PET, the device comprising:

a blowing nozzle for blowing a fluid under pressure inside a blank having a body arranged in a moulding cavity of a mould and having a neck protruding from a surface of said mould, with a flange of said neck resting on said surface of the mould, the blowing nozzle being mobile between two limit positions comprising a high position raised above the mould and a low blow moulding position in which the blowing nozzle is operatively in tight connection with the neck so that blow air under pressure is injected into the blank; and clamping means, arranged above the mould, for supporting a blank by a respective neck substantially coaxially with the moulding cavity of the mould;

wherein means for supporting said clamping means allows a movement of said clamping means substantially parallel to the blowing axis of the blowing nozzle between a raised position and a lowered position in which the body of the blank is engaged in the cavity of the mould, at least one limb of the clamping means is mobile transversely to the blowing axis of the blowing nozzle, mechanical coupling means is interposed between said clamping means and the blowing nozzle, for synchronizing the movements of the clamping means with the displacement of the blowing nozzle, and the blowing nozzle is attached to a means for controlling a displacement of the blowing nozzle which comprises a roller adapted for engaging a fixed cam.

17. Blow moulding device according to claim 16, wherein a transversal plate is fixed to on a blowing end of the blowing nozzle, to which said roller is firmly attached being arranged for following a cam race of the limb of the clamping means and the means for controlling the displacement of the blowing nozzle.

* * * * *